US008847546B2

(12) United States Patent
Baarman et al.

(10) Patent No.: US 8,847,546 B2
(45) Date of Patent: *Sep. 30, 2014

(54) INDUCTIVE POWER SUPPLY SYSTEM WITH BATTERY TYPE DETECTION

(75) Inventors: David W. Baarman, Fennville, MI (US); Matthew J. Norconk, Grand Rapids, MI (US); Hai D. Nguyen, Grand Rapids, MI (US); Joshua K. Schwannecke, Grand Rapids, MI (US); Brad A. Zylstra, East Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/364,615

(22) Filed: Feb. 2, 2012

(65) Prior Publication Data
US 2012/0133324 A1 May 31, 2012

Related U.S. Application Data

(63) Continuation of application No. 12/390,204, filed on Feb. 20, 2009, now Pat. No. 8,120,311.

(60) Provisional application No. 61/030,749, filed on Feb. 22, 2008.

(51) Int. Cl.
*H02J 7/00* (2006.01)
*H02J 17/00* (2006.01)
*H02J 7/02* (2006.01)

(52) U.S. Cl.
CPC ............ *H02J 7/025* (2013.01); *H02J 7/0004* (2013.01)
USPC .......................................... 320/106; 307/104

(58) Field of Classification Search
None
See application file for complete search history.

(56) References Cited

U.S. PATENT DOCUMENTS

| 4,754,180 A | 6/1988 | Kiedrowski |
| 4,755,783 A | 7/1988 | Fleischer et al. |

(Continued)

FOREIGN PATENT DOCUMENTS

| EP | 1096638 | 5/2001 |
| GB | 2394843 | 5/2004 |

(Continued)

OTHER PUBLICATIONS

Battery technical sheets.

(Continued)

*Primary Examiner* — Vinh Nguyen
(74) *Attorney, Agent, or Firm* — Warner Norcross & Judd LLP

(57) ABSTRACT

An inductive power supply system to wirelessly charge a remote device based on detected battery characteristics. The system includes an inductive power supply with a primary coil capable of inductively providing power to a secondary coil in a remote device. The inductive power supply and remote device include communication means for wirelessly communicating. The system further includes a remote device, having a battery with detectable battery characteristics. In operation, the remote device is capable of detecting the battery characteristics by applying a qualification charge to the battery. The inductive power supply system is capable of identifying the battery installed in the remote device by analyzing the detected battery characteristics. The inductive power supply system selects an appropriate charging algorithm based on the analyzed characteristics.

34 Claims, 8 Drawing Sheets

(56) References Cited

U.S. PATENT DOCUMENTS

| | | |
|---|---|---|
| 5,596,567 A | 1/1997 | deMuro et al. |
| 5,734,253 A | 3/1998 | Brake et al. |
| 5,734,254 A * | 3/1998 | Stephens .................. 320/106 |
| 5,963,012 A | 10/1999 | Garcia et al. |
| 6,016,046 A | 1/2000 | Kaite et al. |
| 6,031,353 A | 2/2000 | Banyas et al. |
| 6,967,462 B1 | 11/2005 | Landis |
| 7,012,402 B2 | 3/2006 | Miller et al. |
| 7,208,912 B2 | 4/2007 | Ghabra et al. |
| 7,212,110 B1 | 5/2007 | Martin et |
| 7,375,492 B2 | 5/2008 | Calhoon et al. |
| 7,414,380 B2 | 8/2008 | Tang et al. |
| 7,518,267 B2 | 4/2009 | Baarman |
| 7,791,311 B2 | 9/2010 | Sagoo |
| 8,120,311 B2 * | 2/2012 | Baarman et al. ............. 320/106 |
| 2007/0024238 A1 | 2/2007 | Nakade et al. |

FOREIGN PATENT DOCUMENTS

| | | |
|---|---|---|
| GB | 2414120 | 11/2005 |
| JP | 09103037 | 4/1997 |
| JP | 09-130983 | 5/1997 |
| JP | 63-253830 | 10/1998 |
| JP | 2003-264934 | 9/2003 |
| JP | 2004-328916 | 11/2004 |
| WO | 03096361 | 11/2003 |
| WO | 2004038888 | 5/2004 |
| WO | WO 2004/038887 | 5/2004 |
| WO | 2004073166 | 8/2004 |

OTHER PUBLICATIONS

International Search Report and Written Opinion for International Application No. PCT/US2009/034607 dated Oct. 21, 2009.

* cited by examiner

INDUCTIVE POWER SUPPLY SYSTEM WITH BATTERY TYPE DETECTION

BACKGROUND OF THE INVENTION

The present invention relates to wireless power and more particularly to a system and method for detecting remote device battery characteristics and wirelessly supplying power to the remote device based on the detected characteristics.

Charging of batteries with an inductive power supply is well-known. Inductive chargers for electric automobiles or small electric appliances such as toothbrushes have met some amount of success. Because inductive charging does not require a physical connection between the battery and the charger, the charging is considerably more convenient. However, there is room for improvement. One inconvenient aspect of conventional inductive chargers is that they only charge one battery chemistry. That is, conventional inductive chargers use pre-determined hard coded charging algorithms that do not adapt to account for different battery chemistries. Many devices accept batteries of multiple chemistries, but if the user does not employ the correct batteries for the particular inductive charger, the batteries will not charge efficiently, and might not charge at all.

Some wired battery chargers employ multiple charging algorithms to accommodate devices that use different battery chemistries. For example, some flashlights accept either NiMH batteries or alkaline batteries. Wired battery chargers rely on a direct physical connection to the batteries, which conventional inductive charging systems do not have, in order to determine battery chemistry. For example, conventional wired battery chargers may determine remote device battery chemistry by directly sensing voltage, current or temperature during a qualification charge. These direct measurements may not be taken by a conventional inductive charger, which makes determining the remote device battery chemistry and other remote device battery characteristics difficult.

SUMMARY OF THE INVENTION

The present invention provides an inductive power supply system and method for detecting remote device battery characteristics and wirelessly supplying power to the remote device based on the detected characteristics. The system and method may accommodate a remote device that accepts batteries with various battery characteristics or multiple remote devices that operate using batteries with different battery characteristics.

One embodiment of the system includes an inductive power supply with a primary circuit and primary coil as well as a remote device with a secondary coil, secondary circuit and battery. The primary circuit includes a controller, a driver, a switch, and a communication means for communicating with the secondary circuit. The secondary circuit includes a rectifier, one or more sensors, a controller, a communication means for communicating with the primary circuit and a switch. The primary coil and secondary coil inductively couple to wirelessly transfer power from the inductive power supply to the remote device according to a selected wireless power charging algorithm. The wireless power charging algorithm is selected based on at least one characteristic of the battery, which are detected by the secondary circuit. The remote device may also store and communicate data about the secondary device, such as number of batteries, expected cell types, reference voltage or calibration information.

One embodiment of the method includes the steps of identifying the remote device, qualifying the battery of the remote device, selecting a wireless power charging algorithm based on the battery qualification and wirelessly charging the remote device using the selected wireless power charging algorithm.

The present invention provides a simple and effective system and method for wirelessly charging qualified batteries of a remote device, regardless of the particular type of rechargeable batteries employed by the device. The ability for the inductive power supply system to effectively detect various battery characteristics and employ an appropriate wireless power charging algorithm results in additional flexibility and transparency for the user.

These and other objects, advantages, and features of the invention will be readily understood and appreciated by reference to the detailed description of the current embodiment and the drawings.

DESCRIPTION OF THE CURRENT EMBODIMENT

I. Overview

Figure 1:
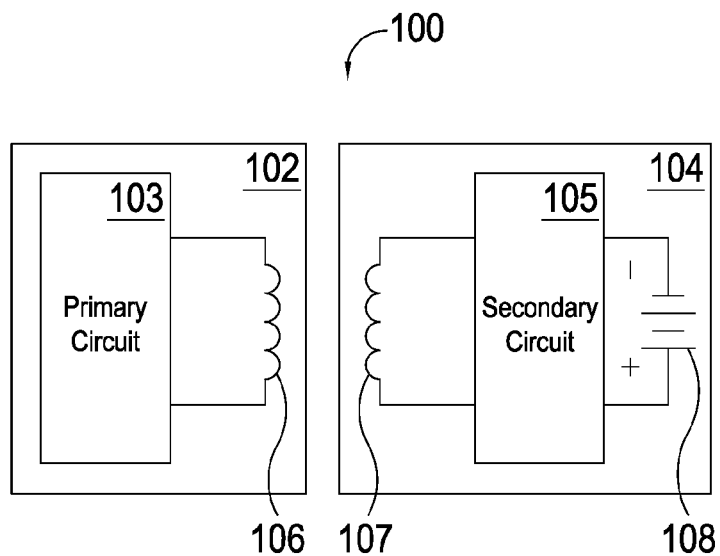
FIG. 1 is a block diagram of an inductive power supply system.

An inductive power supply system in accordance with an embodiment of the present invention is shown in FIG. 1, and generally designated 100. The inductive power supply 102 includes a primary circuit 103 and a primary coil 106. The remote device 104 includes a secondary coil 107, a secondary circuit 105 and a battery 108. The secondary circuit 105 detects certain remote device battery characteristics and the system 100 uses the detected characteristics to determine whether the battery qualifies for charging. If the battery qualifies, an appropriate wireless power charging algorithm is selected and used to wirelessly charge the battery. Although the present invention is generally described in connection with a single battery, a person of ordinary skill in the art would understand that the present invention may be modified to operate with remote devices that have multiple batteries and batteries that have multiple cells.

Figure 7:
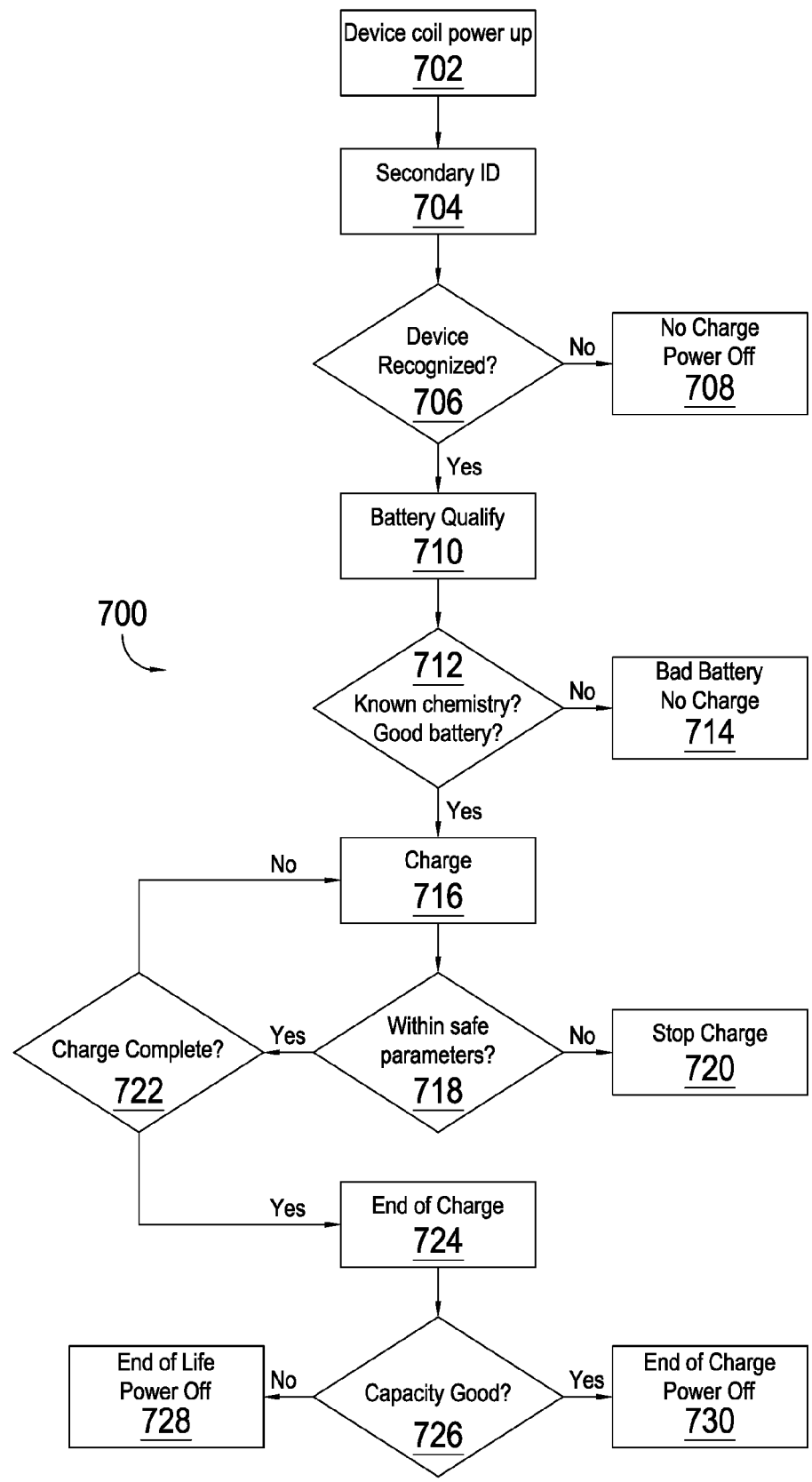
FIG. 7 is a flowchart illustrating a method for detecting remote device battery characteristics and wirelessly supplying power to the remote device based on the detected characteristics.

A method for detecting remote device battery characteristics and wirelessly supplying power from the inductive power supply to the remote device based on the detected characteristics in accordance with an embodiment of the present invention is illustrated in FIG. 7, and generally designated 700. The method includes identifying the remote device 702-708, qualifying the battery of the remote device including selecting a wireless power charging algorithm based on the battery qualification 710-714, and wirelessly charging the remote device using the selected wireless power charging algorithm 716-724. Other optional steps may be included, such as testing the capacity of the remote device battery 726-730.

The inductive power supply system 100 may include memory 203/317 capable of storing, among other things, wireless power supply charging algorithms and battery types. In one embodiment, each wireless power supply charging algorithm is associated with at least one different battery type. In one embodiment, each wireless power supply charging algorithm is associated with at least one different battery chemistry. Further, the memory 203/317 may also store associations between battery characteristics and battery types. In one embodiment the primary controller 202 includes memory 203 and the secondary controller 316 includes memory 317. In alternative embodiments, only one of the controllers includes memory or the memory is external to the controllers and may be included in the inductive power supply or the remote device. The information stored in memory may be used to permit the inductive power supply 102 to efficiently power the remote device 104. In applications where the inductive power supply is capable of identifying the remote device, the memory may includes the unique resonant frequency (or pattern of frequencies) for various remote device 102, along with the desired collection of associated information, such as maximum and minimum operating frequencies, current usage, number of batteries and size of batteries. The memory may, however, include essentially any information that may be useful to the inductive power supply 102 in operating the remote device 104. For example, the memory may include information regarding the wireless communication protocol of the remote device.

II. Inductive Power Supply

The present invention is suitable for use with essentially any inductive power supply. Accordingly, the inductive power supply 102 will not be described in detail. Suffice it to say that the inductive power supply 102 includes a primary circuit 103 and a primary coil 106. The power supply circuit 103 generates and applies alternating current to the primary coil 106. As a result of the alternating current applied by the power supply circuit 103, the primary coil 106 generates an electromagnetic field. The power supply circuit 103 may be essentially any circuitry capable of supplying alternating current to the primary coil 106 at the desired frequency or frequencies. For example, the power supply circuit 103 may be the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

Figure 5:
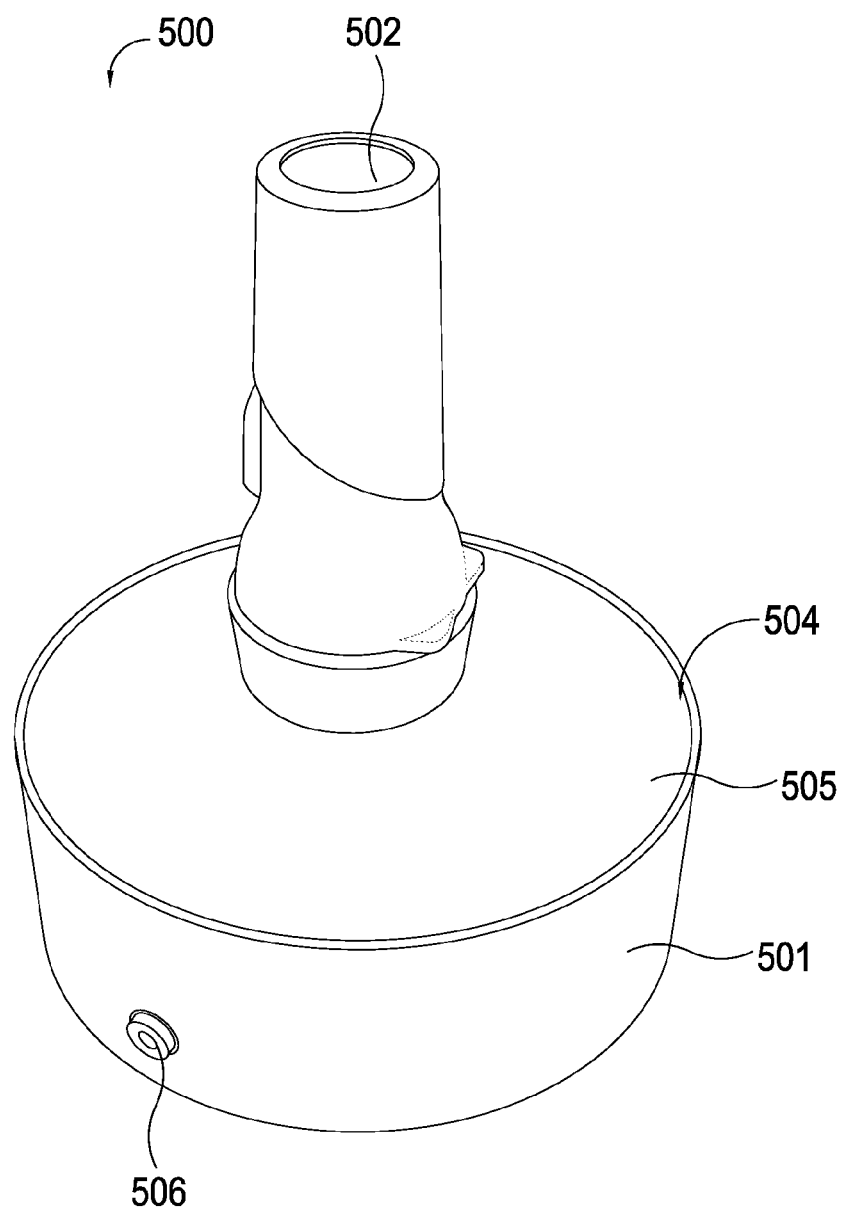
FIG. 5 is a picture of an inductive power supply system including an inductive power supply and a flashlight.

One embodiment of an inductive power supply system in accordance with the present invention is pictured in FIG. 5. The inductive power supply system depicts an inductive power supply 504 and remote device flashlight 502. The inductive power supply 504 is contained within a housing 501 having a surface 505 on which to place the remote device flashlight 502. The housing includes a power plug adapter 506 for plugging the inductive power supply into a wall outlet. The size, shape and configuration of the housing 501 and surface 505 may vary. For example, the surface 505 may be flat and circular (as shown) or it may be contoured to receive one or more remote devices 502. In one embodiment, the housing may incorporate the inventive principles of U.S. Ser. No. 12/390,178 entitled "Magnetic Positioning for Inductive Coupling" and filed on Feb. 20, 2009 by Baarman.

Figure 2:
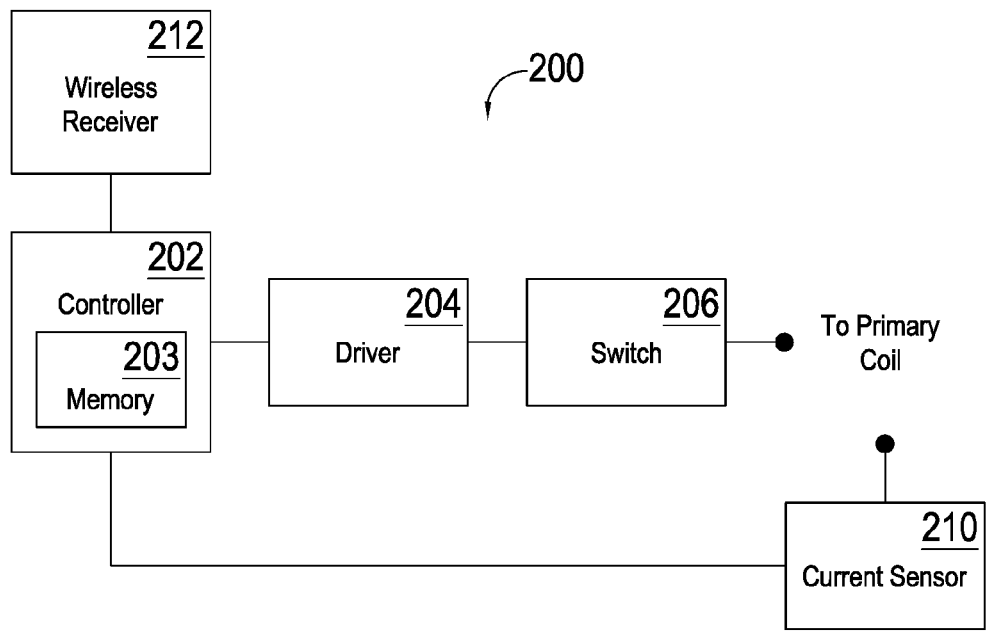
FIG. 2 is a block diagram of a primary circuit.

One embodiment of a primary circuit of an inductive power supply 102 is illustrated in FIG. 2, and generally designated 200. The primary circuit 200 of the illustrated embodiment generally includes a primary controller 202, a driver circuit 204 and a switching circuit 206. The primary circuit 200 also includes a communication means for communicating with the remote device. In the illustrated embodiment, primary circuit 200 includes a wireless IR receiver 212 and a current sensor 210. The current sensor 210 may be used to sense reflected impedance from the remote device, which effectively allows communication over the inductive coupling. In some embodiments, a peak detector replaces or is used in conjunction with the current sensor 210. In alternative embodiments, the receiver 212 or current sensor 210 may be deleted. In other alternative embodiments, the wireless communication means may replace one or both of the receiver 212 and current sensor 210, for example, any of WIFI, infrared, Bluetooth, cellular or RFID devices may be implemented in the primary circuit 200. In operation, as described above, the primary controller 202, driver circuit 204 and switching circuit 206 apply alternating current to the primary coil 106 to generate a source of electromagnetic inductive power at a selected frequency.

The primary coil 106 of the illustrated embodiment is a circular coil of wire suitable for generating an electromagnetic field. In some applications, the primary coil 106 may be a coil of Litz wire. The characteristics of the coil may vary from application to application. For example, the number of turns, size, shape and configuration of the coil may vary. Further, the characteristics of the wire may vary, such as length, gauge and type of wire. Although described in connection with a coil of wire, the primary coil 106 may alternatively be essentially any structure capable of generating a suitable electromagnetic field. In one embodiment, the primary coil 106 (or secondary coil 107) may be replaced by a printed circuit board coil, such as a printed circuit board coil incorporating the inventive principles of U.S. Ser. No. 60/975,953, which is entitled "Printed Circuit Board Coil" and filed on Sep. 28, 2007 by Baarman et al, and which is incorporated herein by reference in its entirety.

In certain embodiments of the present invention, the primary controller 202 includes intelligence or programming for making decisions based on the detected battery characteristics. For example, the secondary circuit 105 may be programmed to communicate any detected battery characteristics or a determined battery type to the primary controller 202. Once the primary controller 202 has access to the battery characteristics or determined battery type, an appropriate charging algorithm may be selected from memory or otherwise determined. In other embodiments, the primary controller 202 does not receive and does not have any specific intelligence or programming for making decisions based on the detected battery characteristics. That is, the primary circuit 103 merely receives messages that dictate the desired power level that should be provided. For example, the primary controller 202 may be programmed to ramp up power (subject to safety conditions) until it receives a message from the secondary to stop. In another embodiment, the primary receives instructions from the secondary about whether to provide more or less power. Alternatively, the primary controller may receive specific instructions to transmit at a particular operating frequency or to adjust its operating frequency in a particular manner. In another embodiment, the primary controller may receive instructions from the remote device 104 to reconfigure the primary circuit 103 to change the resonant frequency based on determinations made by the secondary circuit 105 using detected battery characteristics. In yet another embodiment, the primary controller may receive instructions to change the input voltage to adjust the inductive power output.

The primary controller 202 may optionally be programmed with additional features. For example, in one embodiment, the primary controller 202 is programmed to identify remote devices using the inventive principles described in U.S. Ser. No. 11/965,085, which was previously incorporated by reference. The remote device ID may include information about the remote device battery. Alternatively, information about the remote device battery may be accessed using the remote device ID as a key to a look up table on the inductive power supply. For example, the information may indicate whether the remote device is within the power range of the inductive power supply. Or, the information may include the types and sizes of batteries accepted by the remote device. For example, a particular remote device may only be capable of receiving two AA batteries due to geometric constraints.

Optionally, the inductive power supply may include an LED scheme to indicate charging status. When the LED is off, no device is present. If the LED is solid, a remote device is detected. A flashing LED indicates that the battery is bad or unqualified. A breathing LED indicates that the remote device is currently being charged. A color or intensity change in the LED indicates that charging is complete. A person of ordinary skill in the art would understand that additional or different schemes may be implemented to indicate charging status to the user.

III. Remote Device

The present invention is suitable for use with a wide variety of remote devices of varying designs and constructions. The present invention may accommodate remote devices that accept various battery types. Battery type is used generally to distinguish between batteries based on one or more battery characteristics of the batteries. For example, batteries with different battery types may have different battery chemistry, battery cells, battery capacity, battery size, battery shape, battery voltage characteristics, battery current characteristics, battery temperature characteristics, battery terminal layouts, cycles, span of cycles, or any combination thereof. The scope of the term battery type may differ depending on the embodiment. For example, in some embodiments, batteries may be different battery types even if they only differ by a single battery characteristic. In other embodiments, batteries may be the same battery type even if they only share a single battery characteristic. The term battery is used throughout this application in the singular, but a person of ordinary skill in the art would understand that the battery could be a battery pack and that battery characteristics or type of battery may refer to battery pack characteristics or the type of battery pack.

The present invention may accommodate individually charging multiple remote devices that operate using batteries with different battery characteristics. In alternative embodiments, multiple remote devices with similar battery characteristics may be charged simultaneously. It is anticipated that these various remote devices will require power at varying frequency and will have different power requirements.

As noted above, the remote device 104 generally includes a secondary coil 107, a secondary circuit 105 and a battery 108. The remote device 104 is illustrated representatively in the drawings, but it may be essentially any device or component that operates on batteries. For example, a flashlight (as shown in FIG. 5), cell phone, personal digital assistant, digital media player or other electronic device that is capable of utilizing a rechargeable battery.

The secondary coil 107 of the illustrated embodiment is a circular coil of wire suitable for generating electricity when in the presence of a varying electromagnetic field. As shown, the secondary coil 107 may correspond in size and shape to the primary coil 106. For example, the two coils 106 and 107 may have substantially equal diameters. In some applications, the secondary coil 107 may be a coil of Litz wire. As with the primary coil 106, the characteristics of the secondary coil 107 may vary from application to application. For example, the number of turns, size, shape and configuration of the secondary coil 107 may vary. Further, the characteristics of the wire may vary, such as length, gauge and type of wire. Although described in connection with a coil of wire, the secondary coil 107 may alternatively be essentially any structure capable of generating sufficient electrical power in response to the intended electromagnetic field.

Figure 3:
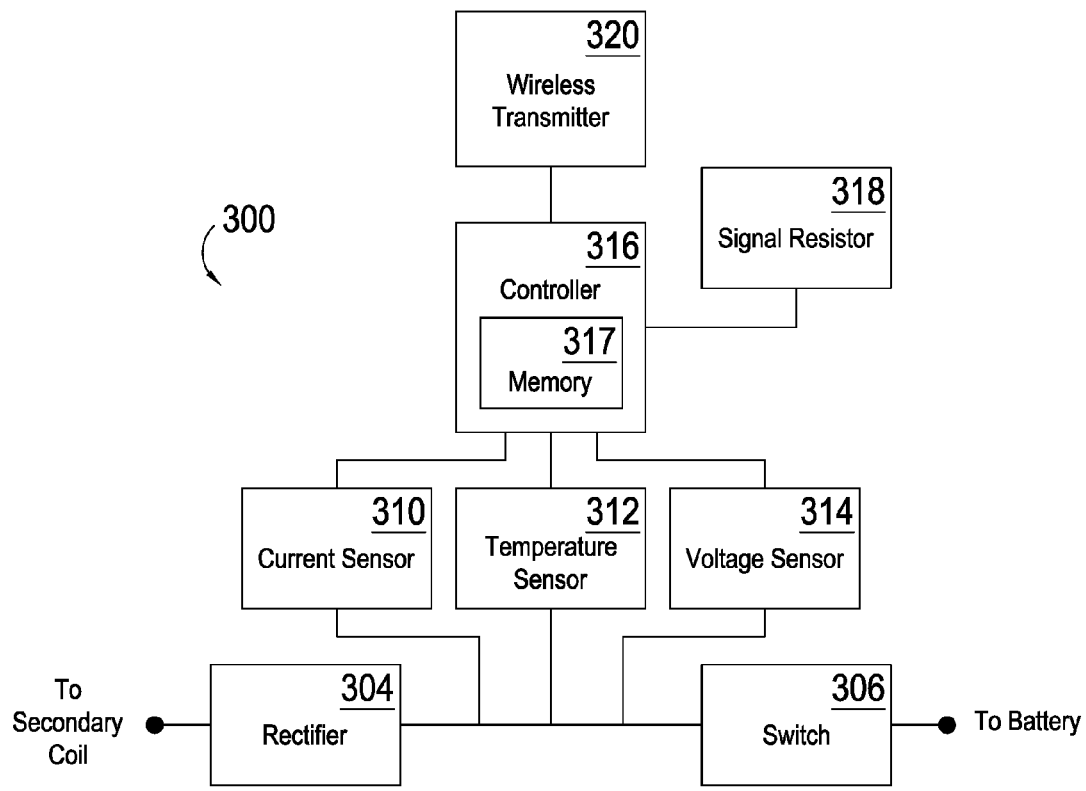
FIG. 3 is a block diagram of a secondary circuit.

A secondary circuit in accordance with an embodiment of the present invention is shown in FIG. 3, and generally designated 300. The illustrated secondary circuit 300 includes a secondary controller 316, a rectifier 304, a switch 306, a current sensor 310, a temperature sensor 312 and a voltage sensor 314. The secondary circuit 300 also includes a communication means for communicating with the inductive power supply 102. The illustrated embodiment includes a signal resistor 318 for communicating using reflected impedance over the inductive coupling and a wireless transmitter 320. In alternative embodiments, the signal resistor 318 or wireless transmitter 320 may be deleted. In alternative embodiments, other wireless communication means may replace one or both of the wireless transmitter 320 and signal resistor 318. For example, any of a WIFI, infrared, Bluetooth, cellular or RFID device may be used to wirelessly communicate with the inductive power supply 102.

In operation, the illustrated secondary circuit 300 is programmed to detect various battery characteristics, such as battery voltage, battery current, battery temperature or a combination thereof. The secondary circuit uses the detected characteristics to determine whether the battery qualifies for charging and if it does, an appropriate charging algorithm is selected by the secondary controller 316. In alternative embodiments, the intelligence may be spread across the primary circuit and secondary circuit, as described above. For example, as noted above, in one embodiment, the secondary circuit 300 may communicate the detected battery characteristics to the inductive power supply so that an appropriate charging algorithm may be selected by the primary circuit 103.

Figure 4A:
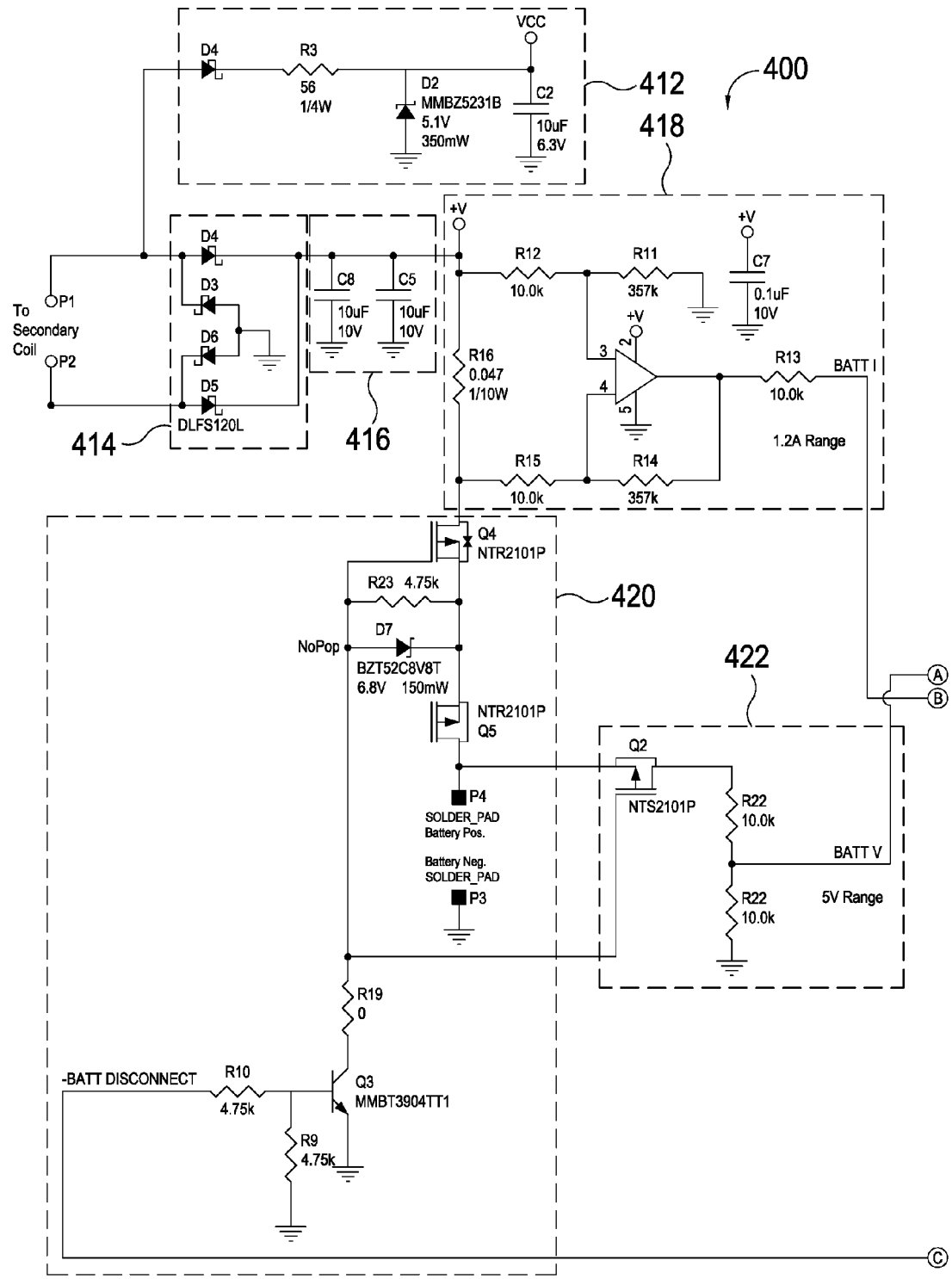
FIG. 4 is a circuit diagram of a secondary circuit.
Figure 4B:
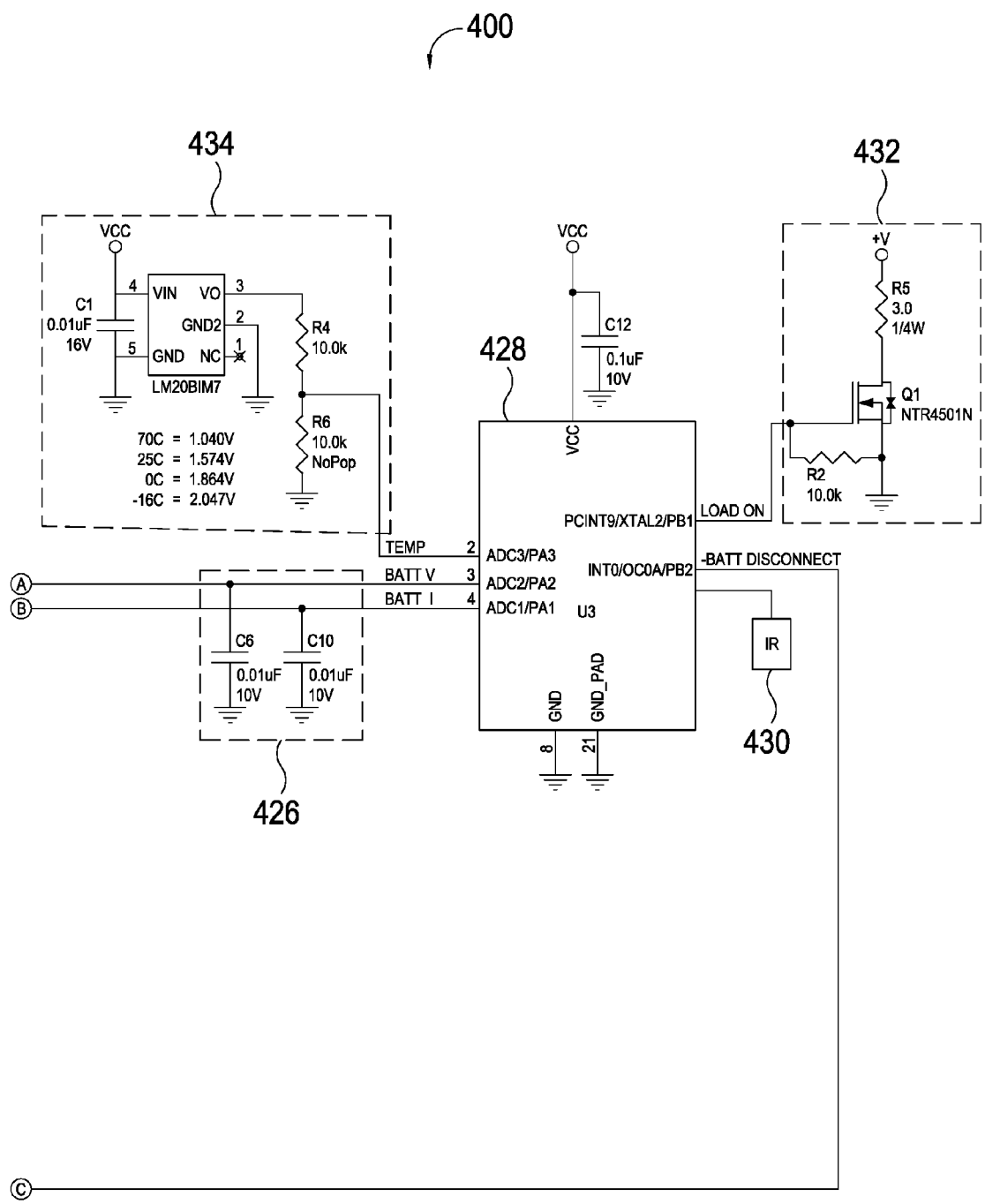

For purposes of disclosure, one embodiment of a secondary circuit is shown in FIG. 4, and generally designated 400. In the embodiment illustrated in FIG. 4, the secondary circuit 400 generally includes a secondary controller 428, rectifier 414 (or other components for converting AC power to DC), a low voltage power supply 412 that scales the received power to operate the secondary controller 428, conditioning circuitry 416, 426 to remove ripple in the signal, current sensor 418, voltage sensor 422, temperature sensor 434, switch 420, a signal resistor 432 and an optional wireless transmitter 430. In operation, the rectifier 414 converts the AC power generated in the secondary coil 107 to DC power, which is typically needed to charge the battery 108. Alternatively, multiple secondary coils receiving power of different phases can be used to reduce the ripple voltage. This is referenced in application 60/976,137, entitled "Multiphase Inductive Power Supply System" filed Sep. 9, 2007 to Baarman et al, which is herein incorporated by reference. Multiple primary coils may be desired to transmit power on different phases in such an embodiment. In alternative embodiments the rectifier may be unnecessary and AC power may be conditioned to be used to power the load.

The secondary circuit includes a battery characteristic detection system for detecting one or more characteristics of a battery that either alone or in combination, directly or indirectly, are indicative of the type of battery installed in the remote device or the wireless power charging algorithms capable of charging that battery. A characteristic is to be considered indicative of the type of battery even if other characteristics must be considered to identify the battery type. Further, a characteristic is to be considered indicative of the type of battery even if the characteristic only allows the battery type to be narrowed to a list of possible battery types. In the current embodiment, the battery characteristic detection system includes a current sensor 418, a voltage sensor 428, and a temperature sensor 434. The current sensor 418 detects the amount of current in the received power and provides that information to the secondary controller 428. The voltage sensor 422 detects the amount of voltage in the received power and provides that information to the secondary controller 428. The temperature sensor 434 detects the temperature and provides that information to the secondary controller 428. Although the illustrated embodiment includes a voltage sensor 422, a current sensor 418 and a temperature sensor 434, alternative embodiments need not include all three. One or more sensors, detectors, or other devices or systems that assess, detect, or sense battery characteristics may replace or supplement the illustrated battery characteristic detection system. In the current embodiment, by sensing the voltage, current and temperature of the battery, the inductive power supply system 100 can determine, among other things, the battery type.

The secondary controller 428 may be essentially any type of microcontroller. In the illustrated embodiment, the secondary controller 428 is an ATTINY2MV-10MU microcontroller. The secondary controller 428 generally includes an analog to digital converter, and is programmed to process the voltage, current and temperature readings in order to determine if the battery qualifies as chargeable. The microprocessor may also include other code unrelated to battery qualification. Furthermore, the ability to have a controller or other intelligence in the remote device allows characterization of various battery characteristics. For example, the secondary may make determinations about battery type and battery life by tracking cycles, span of these cycles and the ability to hold a charge. It also allows coulombs counting, which is a method known in the art for accurate energy use and expenditure calculations. Thresholds may be set for battery end of life tracking on almost any type of battery.

In one embodiment, signal resistor 432 may be used to send information to the primary controller 310. The use of a signal resistor 432 to provide communication from the secondary to the primary was discussed in U.S. patent application Ser. No. 11/855,710, which was previously incorporated by reference. The signal resistor 432, when shunted, sends a communication signal that signifies an over-current or over-voltage state. When the resistor is shunted, the current or peak detector on the primary circuit 103 is able to sense the over-voltage/over-current condition and act accordingly. The signal resistor 432 of the present invention may be shunted systematically to communicate additional data to the primary controller 310. For example, a stream of data could represent the detected current, detected voltage, detected temperature, detected battery chemistry, or merely provide an instruction to the primary circuit 103 to adjust the inductive power supply. Alternatively, the signal resistor could be removed and a different communication means entirely could be used to wirelessly communicate with the primary circuit 103.

Use of a wireless transmitter or transceiver was previously described in U.S. Patent Application Publication US 2004/130915A1 to Baarman, which was previously incorporated by reference. Specifically, the use of WIFI, infrared, Bluetooth, cellular or RFID were previously discussed as ways to wirelessly communicate data between a remote device to an inductive power supply. Further, communication using the induction coils and a power line communication protocol was discussed. Any of these methods of transmitting data could be implemented in the present invention in order to transfer the desired data from the remote device to the inductive power supply.

In the illustrated embodiment, charging is controlled by the secondary circuit. The primary circuit 103 provides wireless power and responds appropriately to control signals from the secondary circuit 105. In the current embodiment, communications happens at pre-defined, continuous intervals while power is being transferred. For example, communication may occur in the form of trip points or error signals.

Figure 6:
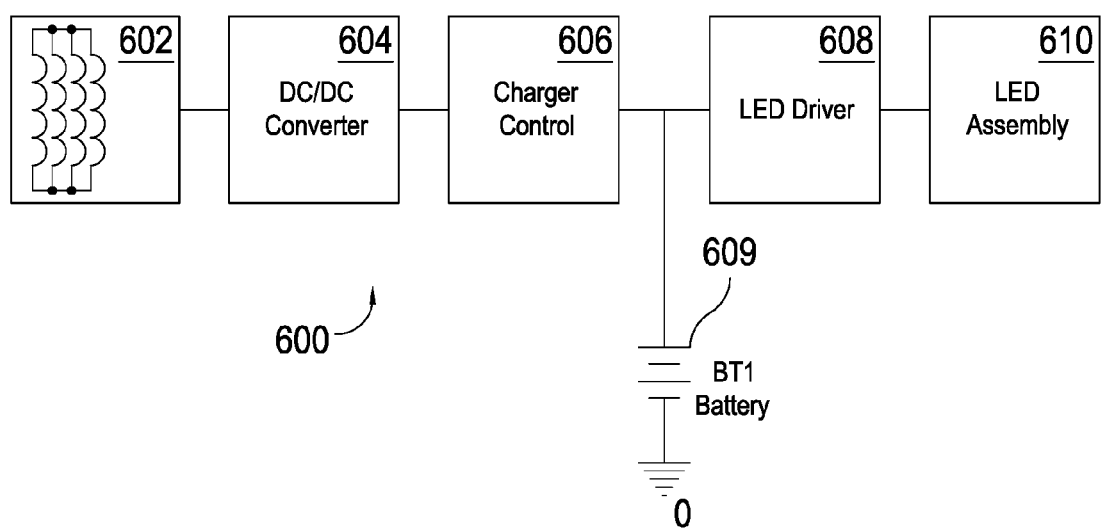
FIG. 6 is a block diagram of a flashlight.

A remote device in accordance with one embodiment of the present invention is shown in FIG. 6, and generally designated 600. The remote device 600 includes Plitz coil 602, a DC/DC converter, a charger controller 606, a battery 609, an LED driver 608 and an LED assembly 610. As noted above with respect to the primary coil, either or both of the primary coil 602 and secondary coil 604 may be replaced by a printed circuit board coil, such as a printed circuit board coil incorporating the inventive principles of U.S. Ser. No. 60/975,953, entitled "Printed Circuit Board Coil" which was previously incorporated by reference. Further, either coil 602, 604 may be replaced with a standard litz wire coil, which in some circumstances grants additional transfer capabilities.

Figure 8:
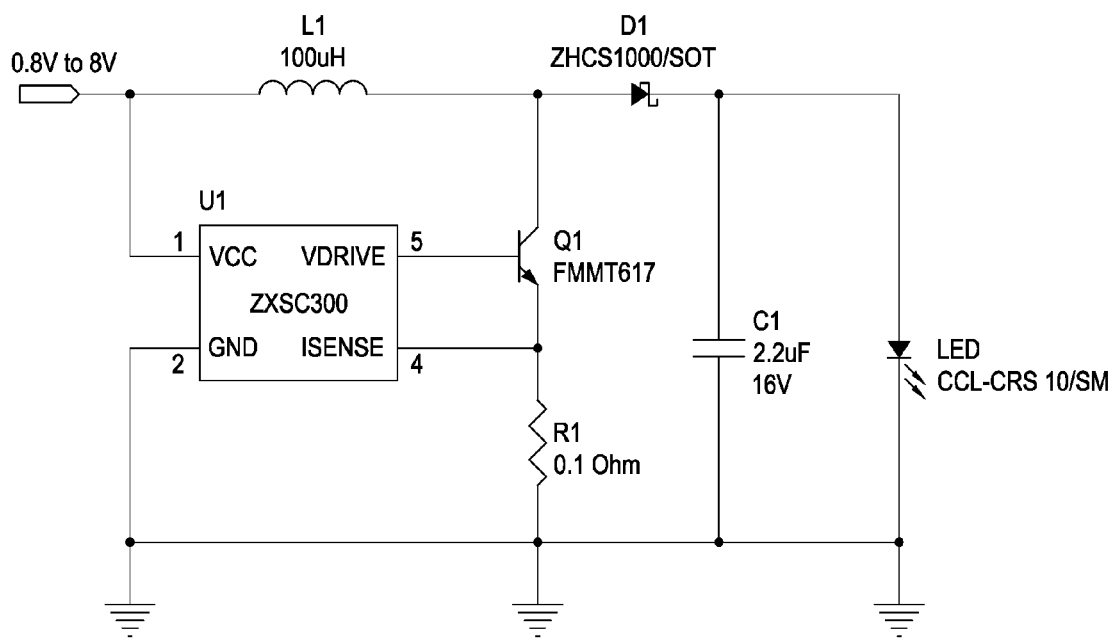
FIG. 8 is a circuit diagram of an LED driver.

Flashlight LEDs typically run at a relatively low voltage range, around 3.6V. The driver takes a voltage in a range and outputs 3.6V for the LED. An exemplary driver is shown in FIG. 8. For example, two nearly depleted AA batteries might give 0.9V each, or 1.8V total. Four new AA batteries might give 1.5V each, or 6V total. The LED driver converts either of these voltages to the 3.6V required by the LED without significant power loss.

A DC/DC converter regulates the amount of current and is particularly useful in applications where the inductive power supply is doing less adjustment. An inductive power supply may supply power to multiple remote devices provided the remote devices have a mechanism to regulate the amount of power received, such as by using a DC/DC converter.

Optionally, the remote device may include an LED and LED scheme to indicate charging status. When the LED is off, no inductive power supply is present. If the LED is solid, the remote device is receiving power. A pre-determined number of LED flashes indicates that the battery is bad. A breathing LED indicates that the remote device is currently being charged. A color or intensity change in the LED indicates that charging is complete. A person of ordinary skill in the art would understand that additional or different schemes may be implemented to indicate charging status to the user. Further, inclusion of an LED and LED scheme on either or both of the inductive power supply and remote device is optional.

IV. Operation

General operation of the inductive power supply 102 and remote device 104 is described in connection with FIG. 7. In particular, a method for detecting remote device battery characteristics and wirelessly supplying power from the inductive power supply to the remote device based on the detected characteristics in accordance with an embodiment of the present invention is illustrated in FIG. 7, and generally designated 700. The method includes optionally identifying the remote device 702-708, qualifying the battery of the remote device including selecting a charging algorithm based on the battery qualification 710-714, and wirelessly charging the remote device using the selected charging algorithm 716-724. Other optional steps may be included, such as testing the capacity of the remote device battery 726-730.

The optional remote device identification may be accomplished using essentially any method. In one embodiment, the inductive power supply periodically transmits an identification charge for a pre-selected amount of time. If a remote device with a secondary coil is present and aligned during the identification charge, the remote device sends a pre-encoded identification string back to the primary. As discussed above, the communication channel could be near field, IR, RF or essentially any other suitable communication channel. In an alternative embodiment, the remote device may include an identification capacitor that creates resonance at a specific frequency. The inductive power supply sweeps a range of identification frequencies seeking resonance. The frequency at which resonance is found may be used to identify the remote device using a look up table on the primary controller. Remote device identification potentially increases safety because metal slugs or other foreign devices will not transmit the proper ID and the inductive power supply will not continue to provide power. Remote device identification is optional though, and embodiments of the present invention need not include remote device identification in order to function.

Battery qualification or battery wireless power charging algorithm selection 710-714 includes detecting battery characteristics, analyzing the known and detected battery characteristics to determine whether the battery qualifies for charging, and selecting an appropriate charging algorithm either directly based on the known and detected battery characteristics or indirectly based on the known and detected battery characteristics. Indirect qualification may include additional analyzing, such as categorizing the battery type of the battery based on the raw battery characteristics. Direct qualification may forgo this step in favor of selecting a charging algorithm based on the raw battery characteristics. In the current embodiment, qualification is primarily dependent on battery chemistry. Unknown chemistries do not charge 712-714, while known chemistries are charged based on their battery chemistry 712-716. In an alternative embodiment, battery qualification includes categorizing the battery into one of a plurality of general power class, each associated with a different charging algorithm. Although the ultimate selection of a wireless power charging algorithm may not be based on raw battery characteristics and instead based on a product of additional analyzing, such as a categorization into battery type or power class, it should be understood that this is ultimately still a selection based on a battery characteristic, either known, detected, or both.

In operation, the secondary controller 428 is programmed to determine if the battery 108 qualifies for charging. Some battery information may be known based on the physical limitations of the remote device 104. For example, the type and size of batteries that fit into the remote device is typically set during manufacture by the geometric configuration of the remote device. Additionally, the remote device may include cell information, including the number of cells. The number of cells and number of batteries may be interrelated are in some applications the terms may be used interchangeably. As noted above, this information may be directly or indirectly stored in memory. That is, specific information related to a specific remote device may be stored in the memory, or a look-up table may be stored in memory which may be accessed using a remote device ID. This information may be factored in to the battery qualification decision. For example, most remote devices cannot operate on both 1.5V AAs and 3.7V LiIon batteries.

Not all remote devices are limited by geometry, some may be capable of accepting batteries of different shapes and sizes. To account for that, the secondary controller 428 may be programmed to narrow down the battery possibilities. For example, the secondary controller 428 may determine the number of battery cells and the starting voltage of each of the cells. If the starting voltage is greater than a pre-defined threshold for that number of cells then the battery may be identified as a LiIon battery. If the starting voltage is less than a different pre-defined threshold for that number of cells the battery may be identified as non-chargeable because of an internal short or over depletion. If the starting voltage is between the two thresholds, the battery may be identified as a non-LiIon battery, such as NiMH or Alkaline.

In addition to using known, pre-defined battery characteristics, unknown battery characteristics may be actively measured. For example, by using the inductive power supply to feed a qualification charge to the remote device battery, the change in voltage may be measured and used to characterize the battery. The qualification charge may be any suitable charge that assists in the identification of battery characteristics. In the current embodiment, the qualification charge is a low current, $\frac{1}{400}^{th}$ of the rated battery capacity which is approximately 20 milliamps. Other steps may be taken to help characterize the battery. For example, a change in current, voltage and/or temperature in response to the qualification charge may be monitored.

In the current embodiment, the secondary circuit 400 monitors the change in voltage in response to the qualification charge. If the change in voltage is above a certain threshold, the internal resistance of the batteries is too high and the batteries are deemed bad or non-rechargeable. If the change in voltage is below a certain threshold the batteries are also deemed bad, likely because they are shorted internally. If the change in voltage is between the two thresholds, the batteries are deemed chargeable and the inductive power supply proceeds to full charge rate.

The voltage is monitored as the full charge rate is employed. Similar thresholds to those employed during the qualification charge may be monitored while charging at the full rate. Passing one of the thresholds is a substantial indication that the battery is near the end of its life. Further, battery capacity may be determined by monitoring the charge rate and battery voltage. If the battery voltage passes a predetermined threshold, the batteries may be deemed damaged or near the end of their life.

Additional information may be provided by the remote device configuration like the number of cells and typical operation with various batteries. For example, points on a curve for each type of battery may be stored in memory on the secondary device. A person of ordinary skill in the art would understand how these curves can be used as patterns to recognize battery types, battery life, diagnostics and other pattern comparison information.

Once full charging rate is reached, any number of battery chemistry charging profiles may be employed. The most common difference in charging algorithm is between nickel based batteries, which utilize a negative delta V algorithm and Li Ion batteries, which transition from a constant current a constant voltage after a current lower limit is reached. Many other battery chemistry charging profiles are known and may be implemented in the present invention. For example, a particular chemistry charging profile may be included for alkaline rechargeable batteries that is different from the Nickel based and LiIon charging profiles. In the current embodiment, the secondary circuit can distinguish between Alkaline, NiMH, NiCad, CZn and Li Ion batteries. In alternative embodiments, the secondary controller may be able to distinguish between additional, different or fewer battery chemistries.

Battery capacity may be determined by monitoring the charge rate and battery voltage. If the battery voltage passes a pre-determined threshold, the batteries may be deemed damaged or near the end of their life.

The above description is that of the current embodiment of the invention. Various alterations and changes can be made without departing from the spirit and broader aspects of the invention.

The invention claimed is:

1. An inductive power supply system capable of charging a battery comprising:
   an inductive power supply including a primary circuit and a primary for wirelessly transferring power;
   a remote device separable from said inductive power supply, said remote device including a secondary for wirelessly receiving power from said inductive power supply and a secondary circuit that includes a battery characteristic detection system for detecting a characteristic of said battery indicative of said battery type, said characteristic of said battery including at least one of a battery voltage characteristic, a battery current characteristic, and a battery temperature characteristic;
   a memory located in said remote device, said memory including a plurality of battery charging algorithms;
   a controller adapted to communicate with said memory, said controller located in said remote device, wherein said controller is programmed to select a battery charging algorithm from said plurality of battery charging algorithms in said memory based at least in part on said detected battery characteristic indicative of said battery type; and
   a communication system for wireless communication between said remote device and said inductive power supply, said communication system including:
      a remote device communication system for wirelessly communicating with said inductive power supply including at least one of a signal resistor for communicating using said secondary and a wireless transmitter; and
      an inductive power supply communication system for wirelessly communicating with said remote device including at least one of a current sensor for communicating using said primary and a wireless receiver.

2. The inductive power supply system of claim 1 wherein said battery is replaceable with a different battery having a different battery type.

3. The inductive power supply system of claim 2 wherein said controller selects a different battery charging algorithm for said different battery based at least in part on said battery characteristic detection system detecting a characteristic of said different battery indicative of a different battery type.

4. The inductive power supply system of claim 1 wherein said memory includes a plurality of battery types, wherein each of said battery types is associated with one or more battery charging algorithms.

5. The inductive power supply system of claim 1 wherein said remote device selects said battery charging algorithm based at least in part on at least one of 1) said detected battery characteristic; and 2) a determined battery type, said determined battery type determined by said controller based at least in part on said detected battery characteristic.

6. The inductive power supply system of claim 1 wherein said characteristic of said battery further includes at least one of battery chemistry, battery cells, battery capacity, battery size, battery shape, charge rate, charge curve battery terminal layouts, cycles, and span of cycles.

7. The inductive power supply system of claim 1 wherein said controller is programmed to control operation of a battery disconnect in order to control power to said battery.

8. The inductive power supply system of claim 7 wherein said controller is programmed to control power to said battery in order to charge said battery according to said selected battery charging algorithm.

9. The inductive power supply system of claim 1 wherein said battery charging algorithm includes a wireless charging algorithm.

10. A remote device separable from an inductive power supply and capable of having a battery with a battery type, said remote device comprising:
    a secondary for wirelessly receiving power from said inductive power supply;
    a battery characteristic detection system for detecting a characteristic of said battery indicative of said battery type of said battery, said characteristic of said battery including at least one of a battery voltage characteristic, a battery current characteristic, and a battery temperature characteristic;
    a controller adapted to communicate with a memory including a plurality of battery charging algorithms, said controller programmed to at least one of:
       1) select a battery charging algorithm from said plurality of battery charging algorithms in said memory based at least in part on said detected battery characteristic indicative of said battery type detected by said battery characteristic detection system;
       2) control charging of said battery according to said selected battery charging algorithm; and
    wherein said controller is programmed to select said battery charging algorithm from said plurality of battery algorithms based on a comparison between said detected battery characteristic and a threshold.

11. The remote device of claim 10 wherein said battery is replaceable with a different battery having a different battery type.

12. The remote device of claim 11 wherein said controller selects a different battery charging algorithm for said different battery based at least in part on said battery characteristic detection system detecting a characteristic of said different battery indicative of a different battery type.

13. The remote device of claim 10 wherein said memory includes a plurality of battery types, wherein each of said battery types is associated with one or more battery charging algorithms.

14. The remote device of claim 10 further comprising a communication system for wirelessly communicating with said inductive power supply, wherein said communication system communicates, to said inductive power supply, information dictating the supply of wireless power to said remote device.

15. The remote device of claim 14 wherein said information includes instructions to change at least one of the amount of power being provided, an operating frequency, and a resonant frequency of the inductive power supply.

16. The remote device of claim 14 wherein said communication system for wirelessly communicating with said inductive power supply includes at least one of a signal resistor for communicating using said secondary and a wireless transmitter.

17. The remote device of claim 10 wherein said characteristic of said battery further includes at least one of battery chemistry, battery cells, battery capacity, battery size, battery shape, charge rate, charge curve battery terminal layouts, cycles, and span of cycles.

18. The remote device of claim 10 wherein in response to said detected battery characteristic being greater than said first threshold, said controller selects a battery charging algorithm for a lithium ion battery.

19. The remote device of claim 10 wherein based on said detected battery characteristic being between said first threshold and a second threshold, said controller selects a battery charging algorithm for a nickel metal hydride battery.

20. The remote device of claim 10 wherein based on said detected battery characteristic being less than said first threshold, said controller determines that said battery is non-chargeable.

21. The remote device of claim 10 wherein said first threshold is based on a number of cells present in said battery.

22. The remote device of claim 10 wherein said controller is programmed to supply a qualification charge to said battery, wherein said detected battery characteristic changes in response to said qualification charge, and wherein said controller selects said battery charging algorithm from said plurality of battery charging algorithms based on said change in said detected battery characteristic.

23. The remote device of claim 10 wherein said controller is programmed to control operation of a battery disconnect in order to control power to said battery.

24. The remote device of claim 23 wherein said controller is programmed to control power to said battery in order to charge said battery according to said selected battery charging algorithm.

25. The remote device of claim 10 wherein said battery charging algorithm includes a wireless charging algorithm.

26. A method for operating a remote device adapted to function with a plurality of different types of batteries, said method comprising the steps of:
receiving wireless power from an inductive power supply;
detecting a characteristic of a battery installed in said remote device, wherein said characteristic of said battery is indicative of a battery type, said characteristic of said battery including at least one of a battery voltage characteristic, a battery current characteristic, and a battery temperature characteristic;
selecting a battery charging algorithm based at least in part on said detected battery characteristic indicative of said battery type, wherein said selecting said battery charging algorithm includes comparing said detected battery characteristic to a first threshold; and
charging said battery according to said selected battery charging algorithm.

27. The method of claim 26 wherein said characteristic of said battery further includes at least one of battery chemistry, battery cells, battery capacity, battery size, battery shape, charge rate, charge curve, battery terminal layouts, cycles, and span of cycles.

28. The method of claim 26 wherein in response to said detected battery characteristic being greater than said first threshold, selecting a battery charging algorithm for a lithium ion battery.

29. The method of claim 26 wherein in response to said detected battery characteristic being between said first threshold and a second threshold, selecting a battery charging algorithm for a nickel metal hydride battery.

30. The method of claim 26 wherein in response to said detected battery characteristic being less than said first threshold, determining that said battery is non-chargeable.

31. The method of claim 26 wherein said first threshold is based on a number of cells present in said battery.

32. The method of claim 26 further comprising supplying a qualification charge to said battery, wherein said detected battery characteristic changes in response to said qualification charge, and wherein said selecting said battery charging algorithm from said plurality of battery charging algorithms is based on said change in said detected battery characteristic.

33. The method of claim 26 further comprising operating a battery disconnect to control power to said battery.

34. The method of claim 33 wherein said charging includes controlling power to said battery according to said selected battery charging algorithm.

* * * * *